US009096787B2

(12) United States Patent
Rowley et al.

(10) Patent No.: US 9,096,787 B2
(45) Date of Patent: Aug. 4, 2015

(54) CORROSION INHIBITING, FREEZING POINT LOWERING COMPOSITIONS

(71) Applicant: Rivertop Renewables, Missoula, MT (US)

(72) Inventors: Stephen Rowley, Lolo, MT (US); David Wilkening, Ronan, MT (US); Richard D. Shirley, Missoula, MT (US); Tyler N. Smith, Missoula, MT (US)

(73) Assignee: Rivertop Renewables, Missoula, MT (US)

( * ) Notice: Subject to any disclaimer, the term of this patent is extended or adjusted under 35 U.S.C. 154(b) by 0 days.

(21) Appl. No.: 14/089,054

(22) Filed: Nov. 25, 2013

(65) Prior Publication Data

US 2014/0312262 A1    Oct. 23, 2014

Related U.S. Application Data

(60) Provisional application No. 61/730,673, filed on Nov. 28, 2012.

(51) Int. Cl.
*C09K 3/18* (2006.01)
*C23F 11/12* (2006.01)

(52) U.S. Cl.
CPC .. *C09K 3/185* (2013.01); *C09K 3/18* (2013.01)

(58) Field of Classification Search
CPC .......... C09K 3/18; C09K 3/185; C23F 11/124
USPC ............. 106/13, 14.11, 14.13, 14.44; 252/70, 252/71, 73, 76
See application file for complete search history.

(56) References Cited

U.S. PATENT DOCUMENTS

| | | |
|---|---|---|
| 1,520,885 A | 12/1924 | Rankin |
| 2,314,831 A | 3/1943 | Kamlet |
| 2,419,019 A | 4/1947 | Hales |
| 2,529,177 A | 11/1950 | Nieland |
| 2,529,178 A | 11/1950 | Nieland |
| 3,346,623 A | 10/1967 | Young |
| 3,362,885 A | 1/1968 | Harned |
| 3,589,859 A | 6/1971 | Foroulis |
| 3,652,396 A | 3/1972 | Tanaka |
| 3,711,246 A | 1/1973 | Foroulis |
| 3,798,168 A | 3/1974 | Tumerman et al. |
| 3,819,659 A | 6/1974 | Baldwin et al. |
| 3,951,877 A | 4/1976 | Okumura et al. |
| 4,000,083 A | 12/1976 | Heesen |
| 4,108,790 A | 8/1978 | Foroulis |
| 4,120,655 A | 10/1978 | Crambes |
| 4,129,423 A | 12/1978 | Rubin |
| 4,485,100 A | 11/1984 | Hochstrasser et al. |
| 4,512,552 A | 4/1985 | Katayama et al. |
| 4,833,230 A | 5/1989 | Kiely et al. |
| 4,834,793 A | 5/1989 | Schneider et al. |
| 4,845,123 A | 7/1989 | Walaszek |
| 5,017,485 A | 5/1991 | Bringer-Meyer |
| 5,256,294 A | 10/1993 | van Reis |
| 5,264,123 A | 11/1993 | Bailey |
| 5,312,967 A | 5/1994 | Kiely et al. |
| 5,329,044 A | 7/1994 | Kiely et al. |
| 5,330,683 A | 7/1994 | Sufrin |
| 5,364,644 A | 11/1994 | Walaszek |
| 5,376,499 A | 12/1994 | Hammerschmidt et al. |
| 5,434,233 A | 7/1995 | Kiely et al. |
| 5,473,035 A | 12/1995 | Kiely et al. |
| 5,478,374 A | 12/1995 | Kiely |
| 5,531,931 A | 7/1996 | Koefed |
| 5,561,160 A | 10/1996 | Walaszek |
| 5,562,828 A | 10/1996 | Olsen et al. |
| 5,891,225 A | 4/1999 | Mishra |
| 5,958,867 A | 9/1999 | Lamberti et al. |
| 5,999,977 A | 12/1999 | Riddle |
| 6,156,226 A | 12/2000 | Klyosov et al. |
| 6,372,410 B1 | 4/2002 | Ikemoto et al. |
| 6,498,269 B1 | 12/2002 | Merbouh et al. |
| 6,831,195 B2 | 12/2004 | Nishimura et al. |
| 6,843,931 B2 | 1/2005 | Sapienza |
| 6,861,009 B1 | 3/2005 | Leist |
| 6,894,135 B2 | 5/2005 | Kiely et al. |
| 6,919,478 B2 | 7/2005 | Kawato et al. |
| 7,125,441 B1 * | 10/2006 | Furman et al. ............. 106/14.42 |
| 7,314,906 B2 | 1/2008 | Kiely et al. |
| 7,658,861 B2 | 2/2010 | Koefod |
| 8,153,573 B2 | 4/2012 | Miralles et al. |
| 8,623,943 B2 | 1/2014 | Kiely |

(Continued)

FOREIGN PATENT DOCUMENTS

| | | |
|---|---|---|
| CN | 1131651 | 9/1996 |
| CN | 1970488 | 5/2007 |

(Continued)

OTHER PUBLICATIONS

International Search Report and Written Opinion for Application No. PCT/US2013/071520 dated Feb. 5, 2014 (12 pages).
United States Patent Office Action for U.S. Appl. No. 14/206,796 dated Nov. 4, 2014 (35 pages).
United States Patent Office Action for U.S. Appl. No. 12/422,135 dated Dec. 17, 2014 (8 pages).
U.S. Appl. No. 14/089,054, filed Nov. 25, 2013, Presta.
Abbadi et al., New Ca-Sequestering Materials Based on the Oxidation of the Hydrolysis Products of Lactose, Green Chem, 1999, 231-235.

(Continued)

*Primary Examiner* — Anthony J Green

(74) *Attorney, Agent, or Firm* — Lisa V. Mueller; Michael Best & Friedrich LLP

(57) ABSTRACT

The present invention relates to corrosion inhibiting, freeze point lowering compositions comprising a mixture of a freeze point lowering agent and a corrosion inhibiting compound. The corrosion inhibiting, freeze point lowering compositions can be used in deicing brines or deicing solutions.

6 Claims, 1 Drawing Sheet

(56) References Cited

U.S. PATENT DOCUMENTS

| | | | |
|---|---|---|---|
| 8,679,364 | B2 | 3/2014 | Pylkkanen |
| 2003/0109394 | A1 | 6/2003 | Ruhr et al. |
| 2003/0168625 | A1 | 9/2003 | Sapienza et al. |
| 2003/0176305 | A1 | 9/2003 | Hoyt et al. |
| 2004/0025908 | A1 | 2/2004 | Douglas et al. |
| 2004/0028655 | A1 | 2/2004 | Nelson et al. |
| 2005/0202981 | A1 | 9/2005 | Eveland et al. |
| 2005/0202989 | A1 | 9/2005 | Wilson |
| 2005/0230658 | A1 | 10/2005 | Koefod |
| 2007/0037727 | A1 | 2/2007 | Fiore et al. |
| 2007/0278446 | A1 | 12/2007 | Koefod |
| 2008/0099716 | A1 | 5/2008 | Koefod |
| 2008/0287334 | A1 | 11/2008 | Smith et al. |
| 2009/0250653 | A1 | 10/2009 | Kiely |
| 2010/0041574 | A1 | 2/2010 | Warkotsch et al. |
| 2010/0191002 | A1 | 7/2010 | Kiely |
| 2011/0269662 | A1 | 11/2011 | Miralles et al. |
| 2012/0035356 | A1 | 2/2012 | Kiely |
| 2012/0119152 | A1 | 5/2012 | Smith |
| 2012/0277141 | A1 | 11/2012 | Smith |
| 2012/0295986 | A1 | 11/2012 | Smith |
| 2012/0305832 | A1 | 12/2012 | Kiely |

FOREIGN PATENT DOCUMENTS

| | | |
|---|---|---|
| DE | 2016686 | 11/1970 |
| DE | 1929968 | 12/1970 |
| DE | 117492 | 1/1976 |
| DE | 3331751 | 3/1984 |
| DE | 3519884 | 1/1986 |
| EP | 0652305 | 5/1995 |
| EP | 0758678 | 2/1997 |
| EP | 0819653 | 1/1998 |
| EP | 1201617 | 5/2002 |
| FR | 2054945 | 6/1971 |
| FR | 2115300 | 8/1972 |
| GB | 866840 | 5/1961 |
| GB | 2405636 | 9/2003 |
| JP | 47048091 | 12/1972 |
| JP | S51011030 | 1/1976 |
| JP | 51041578 | 11/1976 |
| JP | 54043840 | 4/1979 |
| JP | S57192270 | 11/1982 |
| JP | S58091174 | 5/1983 |
| JP | 60-50188 | 3/1985 |
| JP | S60050188 | 3/1985 |
| JP | 60108352 | 6/1985 |
| JP | 60112676 | 6/1985 |
| JP | 63248782 | 10/1988 |
| JP | 04214057 | 8/1992 |
| JP | H06306652 | 11/1994 |
| JP | H09104687 | 4/1997 |
| JP | 2003306369 | 10/2003 |
| JP | 2004123465 | 4/2004 |
| JP | 2008054806 | 3/2008 |
| KR | 20020066275 | 8/2002 |
| PL | 98149 | 8/1978 |
| RO | 69880 | 4/1981 |
| WO | 92/07108 | 4/1992 |
| WO | WO 00/34221 | 6/2000 |
| WO | WO 2004/052958 | 6/2004 |
| WO | WO 2004/052959 | 6/2004 |
| WO | WO 2008/021054 | 2/2008 |
| WO | WO 2009/065143 | 5/2009 |
| WO | WO 2012/065001 | 5/2012 |
| WO | WO 2012/145688 | 10/2012 |
| WO | WO 2012/145690 | 10/2012 |
| WO | 2013/009090 | 6/2013 |
| WO | WO 2013/090090 | 6/2013 |

OTHER PUBLICATIONS

Abd El Kader, J.M. et al., "Corrosion inhibition of mild steel by sodium tungstate in neutral solution. Part 3. Coinhibitors and synergism," British Corrosion Journal, 33, 152-157 (1998) Chern Abstr AN 1998:796697.

Abdallah, M. "Sodium gluconate, triethanolamine and their mixtures as corrosion inhibitors of carbon steel in 3.5% NaCl solution," Journal of the Electrochemical Society of India, 48, 121-127, (1999) Chern Abst AN 1999:374923.

Allcock, H.R. et al., "Effect of nonstoichiometric reactant ratios on linear condensation polymers," Contemporary Polymer Chemistry, 2nd Edition, Prentice-Hall, New Jersey (1990) Part II, 274-275.

Billmeyer, F.W., Jr., "Molecular weight and molecular-weight distribution," Textbook of Polymer Science, 3rd Edition, Wiley Interscience, New York (1984) 38-47.

Cantrell, C. E., et al., "s-Dicarbonyl Sugars. 5. A Novel Synthesis of a Branched-Chain Cyclitol," J. Org. Chern. (1977) 42(22):3562-3567.

Carter, Andy, "Modifications in the Preparation of Glucaric Acid and Some 4-alkyl-4-azaheptane-1,7-diamines," 1998, Thesis, University of Alabama, Birmingham, AL, p. 18-20.

Chen, L., "Experimental and Theoretical Studies Concerned with Synthetic Acyclic Carbohydrate Based Polyamides," A Dissertation, University of Alabama at Birmingham (1992).

Chen, L. et al., "Synthesis of steroregular head-tail hydroxylated nylons derived from D-glucose," J. Org. Chem. (1996) 61:5847-5851.

Collepardi, M.M.; "Concrete Admixture Handbook: Properties, Science and Technology", 2nd Edition, Ramachandran,V.S. Editor,Noyes Publications, Park Ridge,NJ (1995) p. 286-409.

Cotton, F.A. et al., Advanced Inorganic Chemistry, 1988, p. 341-353, John Wiley and Sons, New York.

CRC Handbook of Chemistry and Physics, edited by Weast et al., 64th Edition, 1983-84, Boca Raton, Florida, p. B-117.

Dorwald, F.Z., Side Reactions in Organic Synthesis. A Guide to Succsesful Synthesis Design, Wiley-VCH Verlag GmbH & Co., Weinheim, Germany (2005) Preface.

Hashimoto et al., "Macromolecular synthesis from caccharic lactones. Ring-opening polyaddition of D-glucaro- and D-mannaro-1,4:6,3-dilactones with alkylenediamines," J. Polym. Sci. Part A: Polym. Chem. (1993) 31:3141-3149.

Hashimoto, K. et al., "Ring-opening polyaddition of D-glucaro-1,4:6,3-dilactone with p-zylylenediamine," Macromol. Chem. Rapid Commun. (1990) 11:393-396.

Haworth et al., "Lactones of mannosaccharic acid, Part I. 2: 5-dimethyl Δ4-manno-saccharo-3: 6-lactone 1-methyl ester, an analogue of ascorbic acid," J. Chem. Soc. London (1944) 56:217-224.

Haworth, W.N. et al., "Some Derivatives of Glucosaccharic Acids," J. Chern. Soc. (1944) 25:65-76.

Kiely et al., "Hydroxylated nylons based on unprotected esterified D-glucaric acid by simple condensation reactions," J. Am. Chem. Soc. (1994) 116(2):571-578.

Kirk-Othmer Encyclopedia of Chemical Technology, 3rd Edition, Wiley, New York, vol. 16, 617-634, "Hydrocarbon Resins" to "Hypnotics, Sedatives, Anticonvulsants".

Korzh, E.N. et al., "Acidity and corrosion activity of brine refrigeratnts based on calcium chloride," Zhurnal Prikladnoi Khimii Journal (Russian) (1981) 54:2404-2407, Chern. Abstr. AN 1982-147045.

Lachman, A., "Dihydroxy-Tartaric Acid," Amer. Chern. Soc. (1921) 43:2091-2097.

Lewis, B.A. et al., Chapter 13, "Galactaric acid and its derivatives," Methods in Carbohydrate Chemistry, R.L. Whistler et al., editors, (1953) II:38-46.

Lin, "Diverse Applications of Carbohydrate Acids in Organic Synthesis," a Dissertation, University of Alabama at Birmingham (1987) p. 48-50, 72-74.

Lowe et al., Soaps and Detergents—The Inorganic Components, J. Am. Oil Chem. Soc., 1978, 55, 32-35.

Mainhardt, H., "N20 Emissions from Adipic Acid and Nitric Acid Production," IPCC Good Practice Guidance and Uncertainty Management in National Greenhouse Gas Inventories (2001).

Marukame, K., S.Fushoku Burnon linkai Shiryo(Nippon Xairyo Gakkai), journal written in Japanese, 173, 1-8, (1993) Chern. Abstr. AN 1993:543767.

Mehletretter, C.L., "D-Giucaric Acid," Methods in Carbohydrate Chemistry, 1963, p. 46-48, vol. II, Academic Press, New York.

(56) References Cited

OTHER PUBLICATIONS

Mehltretter, C.L. et al., "Saccharic and Oxalic Acids by the Nitric Acid Oxidation of Dextrose," Agric. and Food Chern. (1953) 1(12):779-783.

Merbough, N. et al., "4-AcNH-tempo-Catalyzed Oxidation of Aldoses to Aldaric Acids Using Chlorine or Bromine as Terminal Oxidants," J. Carbohydr. Chem., 2002, 21:.66-77.

Mor, E. et al., "Steel corrosion inhibition in seawater by calcium organic compounds," Annali deii'University di Ferrara, Sezione 5; Chimica Pura ed Applicata, Journal in French (1971),Chem Abstr AN 1971:414090.

Mor, E. et al., "Zinc gluconate as an inhibitor of the corrosion of mild steel in sea water," Lab Corros. Mar. Met, British Corrosion Journal (1976) 11:199-203 Chern. Abstr. AN 1977:129710.

Mustakas, G.C. et al., "Potassium Acid Saccharate by Nitric Acid Oxidation of Dextrose," Industrial and Engineering Chemistry, Mar. 1954, 427-434.

National Association of Corrosion Engineers (NACE) Standard TM0169-95 as Modified by The Pacific Northwest States, Test Method B, Revision (Apr. 2006).

Ogata, N. et al., "Active polycondensation of diethyl 2,3,4,5-tetrahydroxyadipate with diamines," J. Polym. Sci. Polym. Chem. Ed. (1976) 14:783-792.

Ogata, N. et al., "Copolycondensation of hydroxyl diesters and active diesters with hexamethylenediamine," J. Polym. Sci. Polym. Chem. Ed. (1977) 15:1523-1526.

Ogata, N. et al., "Polycondensation reaction of dimethyl tartrate with hexamethylenediamine in the presence of various matrices," J. Polym. Sci. Polym. Chem. Ed. (1980) 18:939-948.

Ogata, N. et al., "Synthesis of hydrophilic polyamide by active polycondensation," J. Polym. Sci. Polym. Lett. Ed. (1974) 12:355-358.

Ogata, N. et al., "Synthesis of hydrophilic polymide from L-tartarate and diamines by active polycondensation," J. Polym. Sci. Polym. Chem. Ed. (1975) 13:1793-1801.

Ogata, N. et al., "Synthesis of polyamides through active diesters," J. Polym. Sci., Polym. Chem. Ed. (1973) 11:1095-1105.

Ogata, N. et al., "Synthesis of polyesters from active diesters," J. Polym. Sci. Chem. Ed. (1973) 11:2537-2545.

Ogata, N., "New polycondensation systems," Polym. Prepr. (1976) 17:151-156.

Pamuk et al. "The preparation of D-glucaric acid by oxidation of molasses in packed beds" Journal of Chemical Technology and Biotechnology (2001) 76:186-190.

Roper, H., "Selection oxidation of D-glucose: chiral intermediates for industrial utilization," Starch/Starke (1990) 42(9):342-349.

Stanek, J. et al., "Monosaccharide dicarboxylic acids," The Monosaccharides, Academic Press, New York and London (1963) Chapter XXXII, p. 741-752.

Styron, S.D. et al., "MM3(96) conformational analysis of D-glucaramide and x-ray crystal structures of three D-glucaric acid derivatives—models for synthetic poly(alkylene D-glucaramides," J. Carb. Chem. (2002) 21(1&2):27-51.

Sukhotin,A.M. et al., "Corrosion inhibitor for steel in calcium chloride solutions," Zashchita Mettalov, Journal in Russion (1982) 18:268-70, Chem Ab 1982:476671.

Van Duin et al., Studies on borate esters. Part 8. Interactions of cations with oxyacid anion-bridged esters of D-glucarate in alkaline media, J. Chem. Soc. Dalton Trans., 1987, 8, 2051-2057.

Van Duin et al., Synergic Coordination of Calcium in Borate-Polyhydroxycarboxylate Systems, Carb. Res., 1987, 162, 65-78.

Van Duin, M. et al., "Studies on borate esters. Part 5. The system glucarate borate calcium (II) as studied by 1H, 11B, and 13C nuclear magnetic resonance spectroscopy," J. Chem. Soc. (1987) 2(4):473-478.

Werpy, T. et al., Top Value Added Chemicals from Biomass, Voil-Results of Screening for Potential, www.osti.gov/bridge, U.S. Dept. of Energy, Oak Ridge, TN (2004) 76 pages.

Wilham et al., Organic Acids as Builders in Linear Alkylbenzene Sulfonate Detergent Formulations, J. Am. Oil Chem. Soc., 1971, 48(11), 682-683.

Wisconsin Biorefiners Development Initiative and references therein, Biorefining Processes-Fermentation of 6-Carbon Sugars and Starchs, www.wisbiorefine.org/proc/ferments.pdr (Feb. 5, 2007).

Wrubl, C. et al., "Zinc gluconate as an inhibitor of the corrosion of copper and zinc in seawater," 1st Corros. Mar Met, British Corrosion Journal (1983) 18:142-147, Chern. Abstr. AN 1984:11228.

Yahiro et al., "Efficient acid production from raw corn starch," J. Fermentation Bioengineering (1997) 84(4):375-377.

International Preliminary Report on Patentability for Application No. PCT/US2007/017493 dated Feb. 10, 2009.

International Preliminary Report on Patentability for Application No. PCT/US2008/083831 dated May 18, 2010 (8 pages).

International Preliminary Report on Patentability for Application No. PCT/US2011/060264 dated May 23, 2013 (8 pages).

International Search Report and Written Opinion for Application No. PCT/US2012/034538 dated Jul. 10, 2012 (11 pages).

International Search Report and Written Opinion for Application No. PCT/US2012/034542 dated Jul. 10, 2012 (10 pages).

International Search Report for Application No. PCT/US2003/039733 dated May 13, 2004 (2 pages).

International Search Report for Application No. PCT/US2007/017493 dated Feb. 12, 2008.

International Search Report for Application No. PCT/US2011/060264 dated Feb. 10, 2012.

International Search Report and Written Opinion for Application No. PCT/US2014/024785 dated Jul. 7, 2014 (13 pages).

United States Patent Office Action for U.S. Appl. No. 11/890,760 dated Apr. 16, 2009 (7 pages).

United States Patent Office Action for U.S. Appl. No. 11/890,760 dated Jul. 25, 2008 (8 pages).

United States Patent Office Action for U.S. Appl. No. 12/272,732 dated Apr. 26, 2011.

United States Patent Office Action for U.S. Appl. No. 12/272,732 dated Aug. 24, 2010.

United States Patent Office Action for U.S. Appl. No. 12/272,732 dated Dec. 9, 2011.

United States Patent Office Action for U.S. Appl. No. 12/272,732 dated Jul. 6, 2012 (12 pages).

United States Patent Notice of Allowance for U.S. Appl. No. 12/272,732 dated Aug. 9, 2013 (9 pages).

United States Patent Office Action for U.S. Appl. No. 12/442,135 dated May 16, 2012 (7 pages).

United States Patent Office Action for U.S. Appl. No. 12/442,135 dated Oct. 26, 2011 (7 pages).

United States Patent Office Action for U.S. Appl. No. 12/753,721 dated Dec. 12, 2011 (7 pages).

United States Patent Office Action for U.S. Appl. No. 12/753,721 dated May 9, 2013 (8 pages).

United States Patent Office Notice of Allowance for U.S. Appl. No. 11/890,760 dated Jan. 8, 2010 (6 pages).

United States Patent Office Notice of Allowance for U.S. Appl. No. 12/753,721 dated Aug. 3, 2012 (5 pages).

United States Patent Office Action for U.S. Appl. No. 13/586,953 dated Jul. 1, 2013 (7 pages).

United States Patent Office Action for U.S. Appl. No. 13/586,953 dated Jan. 27, 2014 (7 pages).

United States Patent Office Notice of Allowance for U.S. Appl. No. 13/586,953 dated Aug. 7, 2014 (6 pages).

United States Patent Office Action for U.S. Appl. No. 13/452,560 dated Dec. 4, 2013 (11 pages).

United States Patent Office Action for U.S. Appl. No. 13/452,560 dated Aug. 19, 2014 (10 pages).

United States Patent Office Action for U.S. Appl. No. 13/452,578 dated Sep. 23, 2014 (12 pages).

United States Patent Office Action for U.S. Appl. No. 14/150,633 dated Sep. 25, 2014 (12 pages).

(56) References Cited

OTHER PUBLICATIONS

United States Patent Office Action for U.S. Appl. No. 13/294,085 dated Oct. 3, 2014 (18 pages).
United States Patent Office Action for U.S. Appl. No. 14/205,627 dated Aug. 27, 2014 (25 pages).
United States Patent Office Action for U.S. Appl. No. 14/205,832 dated Aug. 27, 2014 (21 pages).
United States Patent Office Action for U.S Appl. No. 13/294,085 dated Apr. 1, 2015 (15 pages).
United States Patent Office Action for U.S Appl. No. 14/107,297 dated Mar. 11, 2015 (4 pages).

* cited by examiner

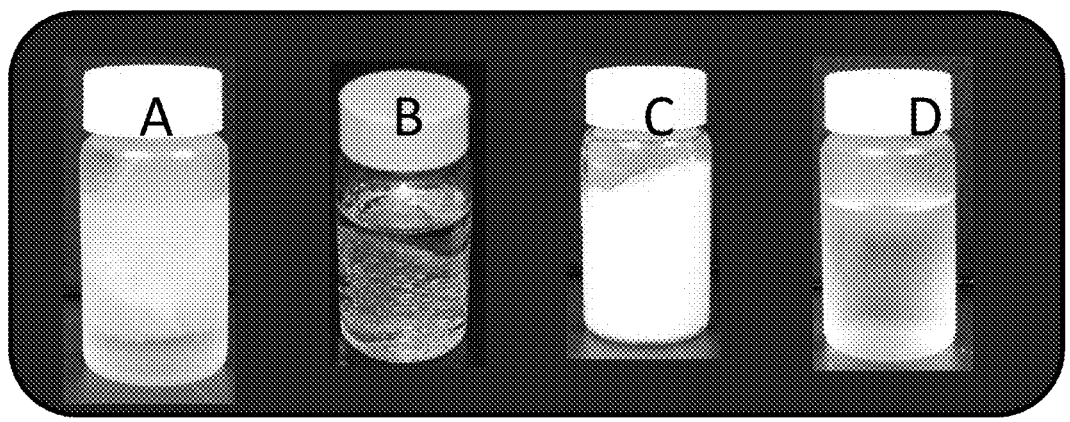

CORROSION INHIBITING, FREEZING POINT LOWERING COMPOSITIONS

CROSS-REFERENCE TO RELATED APPLICATIONS

This claims priority to U.S. Patent Application No. 61/730,673, filed on Nov. 28, 2012, the contents of which are fully incorporated herein by reference.

FIELD OF THE INVENTION

This invention relates to corrosion inhibiting composition with improved stability under cold storage conditions. The compositions comprise a mixture of a freeze point lowering agent and a corrosion inhibiting compound. The freeze point lowering agent used in the composition of the present invention is potassium chloride, ammonium chloride, lithium chloride, potassium acetate, ammonium acetate, lithium acetate, potassium nitrate, ammonium nitrate or lithium nitrate and the corrosion inhibiting compound is a hydroxycarboxylic acid salt, namely, sodium gluconate. The corrosion inhibiting, freeze point lowering compositions can be used in deicing brines or deicing solutions.

BACKGROUND OF THE INVENTION

Freezing point lowering agents are in widespread use for a variety of purposes, especially to reduce the freezing point of an aqueous system so that ice cannot be formed or to melt formed ice. Generally, freezing point lowering agents depend for their effectiveness upon the molar freezing point lowering effect, the number of species which are made available and the degree to which the agent can be dispersed in the liquid phase in which the formation of ice is to be precluded and/or ice is to be melted.

A common use for freeze point lowering agents is in road deicers. Traditionally, deicers comprising a solid salt, such as sodium chloride rock salt, were spread onto roadways (solid deicers); however, there is a growing trend to use liquid deicers for improved deicer performance. In fact, aqueous solutions of salts (liquid deicers) are more effective at preventing ice formation than solid salt because the solution can be applied more evenly on the road and is not displaced by vehicle traffic, thus resulting in a more efficient use of the salt.

The most pervasive of the commonly used products for deicing are common salt, calcium chloride, magnesium chloride, acetates and urea, with common salt (sodium chloride) being the least expensive and most commonly used. Common salt is widely used to melt ice on road surfaces and the like. In this manner, the salt forms a solution with the available liquid in contact with the ice and thereby forms a solution with a lower freezing point than the ice itself so that the ice is melted. Chloride salts, while inexpensive, suffer from relatively severe drawbacks, such as the harmful effects on surrounding vegetation by preventing water absorption in the root systems, and its corrosive effects on roadway infrastructure and motor vehicles. A downside to the use of liquid salt deicers is increased corrosion problems arising from the use of salt water. To mitigate the corrosive effects corrosion inhibitors are added to the salt solution (See, for example, U.S. Pat. No. 7,658,861).

Typically, liquid deicers comprise two components which originate from two different sources, namely, (1) a brine; and (2) a corrosion inhibitor containing solution (which is typically supplied in the form of a concentrated solution). The brine and corrosion inhibitor containing solution are stored separately until combined in the field when needed at the time of use. One of the key requirements for corrosion inhibiting containing solutions is that these solutions be stable in cold storage. Specifically, the corrosion inhibiting containing solution cannot freeze above a certain temperature or form any insoluble material. Therefore, freeze point lowering agents must be added to the corrosion inhibitor solutions to mitigate ice formation. Commonly the freeze point agents are the same salts that constitute the deicing solution, namely sodium chloride or magnesium chloride. However, the addition of freeze point lowering agents to the corrosion inhibitor solutions causes problems. Specifically, these agents tend to form insoluble salts with the corrosion inhibitor or promote crystallization of the corrosion inhibitor through the common ion effect. Therefore, there is a need in the art for new corrosion inhibiting, freeze point lowering agents that when stored in cold temperatures, sufficiently lower the freeze point while forming minimal to no solids.

SUMMARY OF THE INVENTION

In one aspect, the present invention relates to a corrosion inhibiting composition that is stable to cold storage temperatures below about 15° F. The composition comprises: a mixture of water, a freeze point lowering agent and a corrosion inhibiting compound, wherein the freeze point lowering agent is potassium chloride, ammonium chloride, lithium chloride, potassium acetate, ammonium acetate, lithium acetate, potassium nitrate, ammonium nitrate, lithium nitrate or mixtures thereof and the corrosion inhibiting compound is sodium gluconate, wherein said composition is stable to cold storage temperatures at or below about 15° F.

The above described corrosion inhibiting, freeze point lowering can comprise about 25% by weight to about 40% by weight of the corrosion inhibiting compound. Additionally, the above described corrosion inhibiting, freeze point lowering composition can comprise about 1% by weight to about 50% by weight of a freeze point lowering agent.

In another aspect, the present invention relates to a liquid composition comprising an aqueous solution of a freeze point depressant and the above described corrosion inhibiting freeze point lowering composition. In the liquid composition, the aqueous solution can be water. In the liquid composition, the freeze point depressant is selected from the group consisting of sodium chloride, magnesium chloride, calcium chloride, potassium chloride, calcium magnesium acetate, potassium acetate, urea, and ammonium sulfate. In the liquid composition, the composition can comprise about 15% by weight to about 35% by weight of a freeze point depressant.

BRIEF DESCRIPTION OF THE FIGURES

FIG. 1 shows solutions of 34% sodium gluconate and freeze point depressing salts (NaCl, KCl, MgCl$_2$ or NH$_4$Cl) that were prepared on a weight/weight basis as described in Example 1. Specifically, this photograph shows the results when the solutions were placed in a freezer set at a temperature of 15° F. for 3 days. Specifically, the resulting solutions: A) were frozen; B) exhibited crystal formation as seen with sodium gluconate mixed with NaCl; C) exhibited a thick white precipitate formed by combination of sodium gluconate and MgCl$_2$ or CaCl$_2$; or D) a solid free solution as seen by combining sodium gluconate and KCl or NH$_4$Cl.

DETAILED DESCRIPTION OF THE INVENTION

The invention describes novel corrosion inhibiting, freeze (or freezing) point lowering compositions suitable for use in a deicing composition. The corrosion inhibiting, freeze point lowering compositions described herein comprise a mixture of a freeze point lowering agent and a corrosion inhibiting compound. The corrosion inhibiting, freeze point lowering compositions of the present invention are stable to cold storage temperatures at and below about 15° F. (namely, about 15° F., about 14° F., about 13° F., about 12° F., about 11° F., about 10° F., about 9° F., about 8° F., about 7° F., about 6° F., about 5° F., about 4° F., about 3° F., about 2° F., about 1° F., about 0° F.). In another aspect, the corrosion inhibiting, freeze point lowering compositions of the present invention are stable to cold storage temperatures of from about 0° F. to about 15° F., from about 1° F. to about 15° F., from about 2° F. to about 15° F., from about 3° F. to about 15° F., from about 4° F. to about 15° F., from about 5° F. to about 15° F., from about 6° F. to about 15° F., from about 7° F. to about 15° F., from about 8° F. to about 15° F., from about 9° F. to about 15° F. or from about 10° F. to about 15° F. As used herein the term "stable" means that the corrosion inhibiting, freeze point composition of the present invention, when stored at a temperature at or below about 15° F. (namely, about 15° F., about 14° F., about 13° F., about 12° F., about 11° F., about 10° F., about 9° F., about 8° F., about 7° F., about 6° F., about 5° F., about 4° F., about 3° F., about 2° F., about 1° F., about 0° F.), are (1) not frozen or do not contain any ice or do not contain any ice crystals; and (2) are substantially free of any solids (meaning that the composition contains less than 5% solids).

The freeze point lowering agent comprises potassium chloride, ammonium chloride, lithium chloride, potassium acetate, ammonium acetate, lithium acetate, potassium nitrate, ammonium nitrate, lithium nitrate or mixtures thereof. The corrosion inhibiting compound is a hydroxycarboxylic acid salt, namely, sodium gluconate.

The freezing point lowering agent can be used in any form (namely, amorphous or crystalline) in the corrosion inhibiting, freeze point lowering composition.

The corrosion inhibitor can be used in any form (namely, amorphous or crystalline) in the corrosion inhibiting, freeze point lowering composition.

The amount of freeze point lowering agent contained in the corrosion inhibiting, freeze point lowering composition is from about 1% by weight to about 50% by weight. In one aspect, the corrosion inhibiting, freeze point lowering composition contains from about 1% to about 45% by weight of a freeze point lowering agent, from about 1% to about 40% by weight of a freeze point lowering agent, from about 1% to about 35% by weight of a freeze point lowering agent, from about 1% to about 30% by weight of a freeze point lowering agent, from about 1% to about 25% by weight of a freeze point lowering agent, from about 1% to about 20% by weight of a freeze point lowering agent, from about 1% to about 15% by weight of a freeze point lowering agent, from about 1% to about 10% by weight of a freeze point lowering agent or from about 1% to about 5% by weight of a freeze point lowering agent. Specifically, the composition can comprise at least 1% by weight of a freeze point lowering agent, at least 2% by weight of a freeze point lower agent, at least 3% by weight of a freeze point lowering agent, at least 4% by weight of a freeze point lowering agent, at least 5% by weight of a freeze point lowering agent, at least 6% by weight of a freeze point lowering agent, at least 7% by weight of a freeze point lowering agent, at least 8% by weight of a freeze point lowering agent, at least 9% by weight of a freeze point lowering agent, at least 10% by weight of a freeze point lowering agent, at least 11% by weight of a freeze point lowering agent, at least 12% by weight of a freeze point lowering agent, at least 13% by weight of a freeze point lowering agent, at least 14% by weight of a freeze point lowering agent, at least 15% by weight of a freeze point lowering agent, at least 16% by weight of a freeze point lowering agent, at least 17% by weight of a freeze point lowering agent, at least 18% by weight of a freeze point lowering agent, at least 19% by weight of a freeze point lowering agent, at least 20% by weight of a freeze point lowering agent, at least 21% by weight of a freeze point lowering agent, at least 22% by weight of a freeze point lowering agent, at least 23% by weight of a freeze point lowering agent, at least 24% by weight of a freeze point lowering agent, at least 25% by weight of a freeze point lowering agent, at least 26% by weight of a freeze point lowering agent, at least 27% by weight of a freeze point lowering agent, at least 28% by weight of a freeze point lowering agent, at least 29% by weight of a freeze point lowering agent, at least 30% by weight of a freeze point lowering agent, at least 31% by weight of a freeze point lowering agent, at least 32% by weight of a freeze point lowering agent, at least 33% by weight of a freeze point lowering agent, at least 34% by weight of a freeze point lowering agent, at least 35% by weight of a freeze point lowering agent, at least 36% by weight of a freeze point lowering agent, at least 37% by weight of a freeze point lowering agent, at least 38% by weight of a freeze point lowering agent, at least 39% by weight of a freeze point lowering agent, at least 40% by weight of a freeze point lowering agent, at least 41% by weight of a freeze point lowering agent, at least 42% by weight of a freeze point lowering agent, at least 43% by weight of a freeze point lowering agent, at least 44% by weight of a freeze point lowering agent, at least 45% by weight of a freeze point lowering agent, at least 46% by weight of a freeze point lowering agent, at least 47% by weight of a freeze point lowering agent, at least 48% by weight of a freeze point lowering agent, at least 49% by weight of a freeze point lowering agent or at least 50% by weight of a freeze point lowering agent.

The amount of the corrosion inhibitor contained in the corrosion inhibiting, freeze point lowering composition is from about 25% by weight to about 40% by weight. In another aspect, the corrosion inhibiting, freeze point lowering composition contains from about 25% to about 35% by weight of a corrosion inhibitor or from about 25% to about 30% by weight of a corrosion inhibitor. Specifically, the composition can comprise at least 25% by weight of a corrosion inhibitor, at least 26% by weight of a corrosion inhibitor, at least 27% by weight of a corrosion inhibitor, at least 28% by weight of a corrosion inhibitor, at least 29% by weight of a corrosion inhibitor, at least 30% by weight of a corrosion inhibitor, at least 31% by weight of a corrosion inhibitor, at least 32% by weight of a corrosion inhibitor, at least 33% by weight of a corrosion inhibitor, at least 34% by weight of a corrosion inhibitor, at least 35% by weight of a corrosion inhibitor, at least 36% by weight of a corrosion inhibitor, at least 37% by weight of a corrosion inhibitor, at least 38% by weight of a corrosion inhibitor, at least 39% by weight of a corrosion inhibitor at least 40% by weight of a corrosion inhibitor.

The corrosion inhibiting, freeze point lowering composition can also contain anti-caking agents, flow enhancers, thickeners, colorants and the like.

The present invention also relates to an aqueous composition (such as water) containing a combination of a brine and the corrosion inhibiting, freeze point lowering composition described herein and methods for making such a composition. Such a composition can be prepared by mixing or dissolving a brine containing the freeze point depressant and the corrosion inhibiting, freeze point lowering composition of the present invention in water or another suitable liquid to form the liquid composition using routine techniques known in the art. The freeze point depressant used in the brine is selected from the group consisting of sodium chloride, magnesium chloride, calcium chloride, potassium chloride, calcium magnesium acetate, potassium acetate, urea ammonium sulfate and mixtures thereof.

The present invention also relates to a method of deicing. The method involves the step of applying an aqueous composition comprising a brine containing a freeze point depressant and the corrosion inhibiting, freeze point lowering composition of the present invention to a surface or area of interest (such as a road, bridge, walkway, highway, etc.).

The corrosion inhibiting, freeze point lowering composition of the present invention exhibits improved properties over corrosion inhibiting, freeze point lowering mixtures comprising (1) sodium gluconate; and (2) sodium chloride, magnesium chloride, calcium chloride or mixtures thereof. Specifically, corrosion inhibiting, freeze point lowering compositions of the present invention (i) sufficiently lower the freeze point; and (ii) do not form solids, particularly when compared to corrosion inhibiting, freeze point lowering compositions comprising (1) sodium gluconate and (2) sodium chloride, magnesium chloride, calcium chloride or mixtures thereof.

It will be apparent to those of skill in the art that variations may be applied to the compositions and methods described herein and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention.

It is to be understood that the invention is not limited in its application to the details of construction and the arrangement of components set forth in the following description. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It also is understood that any numerical range recited herein includes all values from the lower value to the upper value. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

The following non-limiting examples are purely illustrative.

Example 1

Solutions of sodium gluconate and freeze point depressing salts were prepared on a weight to weight basis as shown below in Table 1. Each solution comprises a fixed 34% (w/w) sodium gluconate and a range of a freeze point depressing salt (Table 1). The solutions were placed in a freezer a temperature set to 15° F. for 3 days. Ice and insoluble solid formation was noted when present. FIG. 1 visually depicts representative examples of the results.

TABLE 1

Solutions of 34% sodium gluconate and freeze point depressing salts at various concentrations were prepared on a weight/weight basis as described below.

| Freeze point depressant | (% w/w) | 3 days, 15° F. | Representative photo |
|---|---|---|---|
| NaCl | 2% | Frozen | A |
|  | 5% | Crystalization | B |
|  | 10% | Crystalization | B |
| KCl | 2% | No ice, no crystals | D |
|  | 5% | No ice, no crystals | D |
|  | 10% | No ice, no crystals | D |
| NH$_4$Cl | 2% | No ice, no crystals | D |
|  | 5% | No ice, no crystals | D |
|  | 10% | No ice, no crystals | D |
| MgCl$_2$ | 2% | Heavy white precipitation | C |
|  | 5% | Heavy white precipitation | C |
|  | 10% | Heavy white precipitation | C |
| CaCl$_2$ | 2% | Heavy white precipitation | C |
|  | 5% | Heavy white precipitation | C |
|  | 10% | Heavy white precipitation | C |

As shown in the above Table 1 and in FIG. 1, mixtures of sodium gluconate and NaCl resulted in crystal formation. Mixtures of sodium gluconate and MgCl$_2$ or CaCl$_2$ resulted in a thick chalky precipitation. Mixtures of sodium gluconate and KCl or NH$_4$Cl resulted in no solid formation.

What is claimed is:

1. A corrosion inhibiting composition stable to cold storage temperatures below about 15° F., the composition comprising: a mixture of water, a freeze point lowering agent and a corrosion inhibiting compound, wherein the freeze point lowering agent is potassium chloride, ammonium chloride, lithium chloride, potassium acetate, ammonium acetate, lithium acetate, potassium nitrate, ammonium nitrate, lithium nitrate or mixtures thereof and the corrosion inhibiting compound is sodium gluconate, wherein said composition is stable to cold storage temperatures at or below about 15° F.; wherein the composition comprises about 25% by weight to about 40% by weight of the corrosion inhibiting compound.

2. The corrosion inhibiting, freeze point lowering composition of claim 1, wherein the composition comprises about 1% by weight to about 50% by weight of a freeze point lowering agent.

3. The corrosion inhibiting, freeze point lowering composition of claim 1, wherein the freeze point lowering agent is potassium chloride, ammonium chloride, lithium chloride, potassium nitrate, ammonium nitrate, lithium nitrate or mixtures thereof.

4. The corrosion inhibiting, freeze point lowering composition of claim 1, wherein the freeze point lowering agent is potassium acetate, ammonium acetate, lithium acetate or mixtures thereof.

5. The corrosion inhibiting, freeze point lowering composition of claim 1, the composition comprising, by weight, about 2% to about 10% potassium chloride, and about 34% sodium gluconate.

6. The corrosion inhibiting, freeze point lowering composition of claim 1, the composition comprising, by weight, about 2% to about 10% ammonium chloride, and about 34% sodium gluconate.

* * * * *